United States Patent
May

(10) Patent No.: US 7,044,103 B2
(45) Date of Patent: May 16, 2006

(54) FUEL QUANTITY MODULATION IN PILOT IGNITED ENGINES

(75) Inventor: Andrew May, Wauwatosa, WI (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 10/919,419

(22) Filed: Aug. 16, 2004

(65) Prior Publication Data

US 2006/0032477 A1    Feb. 16, 2006

(51) Int. Cl.
   F02B 3/00    (2006.01)
   F02M 21/02   (2006.01)
   F02M 43/00   (2006.01)

(52) U.S. Cl. .................. 123/299; 123/304; 123/492; 123/575

(58) Field of Classification Search ........... 123/27 GE, 123/295, 299, 300, 304, 478, 492, 493, 525–529, 123/575–578
See application file for complete search history.

(56) References Cited

U.S. PATENT DOCUMENTS

| | | | | |
|---|---|---|---|---|
| 4,603,674 | A | | 8/1986 | Tanaka ....................... 123/575 |
| 4,708,094 | A | * | 11/1987 | Helmich et al. ............. 123/526 |
| 5,140,959 | A | | 8/1992 | Durbin ....................... 123/304 |
| 5,150,690 | A | * | 9/1992 | Carter et al. ................. 123/527 |
| 5,224,457 | A | | 7/1993 | Arsenault et al. ........... 123/526 |
| 5,315,973 | A | | 5/1994 | Hill et al. .................... 123/304 |
| 5,408,967 | A | | 4/1995 | Foster ......................... 123/264 |
| 5,709,196 | A | * | 1/1998 | Coleman et al. ............. 123/575 |
| 5,713,336 | A | * | 2/1998 | King et al. .................. 123/575 |
| 5,832,905 | A | * | 11/1998 | King et al. .................. 123/575 |
| 6,032,617 | A | | 3/2000 | Willi et al. .................. 123/304 |
| 6,202,601 | B1 | | 3/2001 | Ouellette et al. ............ 123/526 |
| 6,230,683 | B1 | | 5/2001 | zur Loye et al. ............ 123/435 |
| 6,386,149 | B1 | | 5/2002 | Coleman et al. ........... 123/25 C |
| 6,543,395 | B1 | | 4/2003 | Green ......................... 123/526 |
| 6,564,774 | B1 | | 5/2003 | Ellims et al. ................ 123/352 |
| 6,598,584 | B1 | | 7/2003 | Beck et al. .................. 123/299 |
| 6,915,776 | B1 | * | 7/2005 | zur Loye et al. ............ 123/304 |
| 2002/0007816 | A1 | | 1/2002 | Zur Loye et al. ............ 123/295 |
| 2002/0017269 | A1 | | 2/2002 | zur Loye et al. ............ 123/295 |
| 2002/0020388 | A1 | | 2/2002 | Wright et al. ................ 123/304 |
| 2002/0026926 | A1 | | 3/2002 | Loye et al. .................. 123/435 |

(Continued)

FOREIGN PATENT DOCUMENTS

DE    10350797    5/2005

(Continued)

OTHER PUBLICATIONS

International Search Report issued in International Application No. PCT/US2005/027185 dated Nov. 17, 2005; 6 pages.

*Primary Examiner*—Willis R. Wolfe, Jr.
(74) *Attorney, Agent, or Firm*—Fish & Richardson P.C.

(57) ABSTRACT

An engine system includes a first fuel regulator adapted to control an amount of a first fuel supplied to the engine, a second fuel regulator adapted to control an amount of a second fuel supplied to the engine concurrently with the first fuel being supplied to the engine, and a controller coupled to at least the second fuel regulator. The controller is adapted to determine the amount of the second fuel supplied to the engine in a relationship to the amount of the first fuel supplied to the engine to operate in igniting the first fuel at a specified time in steady state engine operation and adapted to determine the amount of the second fuel supplied to the engine in a manner different from the relationship at steady state engine operation in transient engine operation.

44 Claims, 4 Drawing Sheets

U.S. PATENT DOCUMENTS

| | | | |
|---|---|---|---|
| 2002/0078918 A1 | 6/2002 | Ancimer et al. | 123/295 |
| 2002/0148438 A1 | 10/2002 | Ellims et al. | 123/352 |
| 2003/0168037 A1 | 9/2003 | zur Loye et al. | 123/295 |
| 2004/0025831 A1* | 2/2004 | Landi et al. | 123/304 |

FOREIGN PATENT DOCUMENTS

| | | |
|---|---|---|
| EP | 1020629 | 7/2000 |
| WO | WO 00/61927 | 10/2000 |

* cited by examiner

FUEL QUANTITY MODULATION IN PILOT IGNITED ENGINES

The U.S. Government has a paid-up license in this invention and the right in limited circumstances to require the patent owner to license others on reasonable terms as provided for by the terms of DE-FC02–01CH11080 awarded by the Department of Energy.

TECHNICAL FIELD

This disclosure relates to internal combustion engines, and more particularly to operating internal combustion engines.

BACKGROUND

A pilot ignited engine operates on two fuels concurrently, a main fuel primarily responsible for producing torque and a pilot fuel primarily responsible for igniting the main fuel. Because the pilot fuel is intended primarily to ignite the main fuel, the torque produced by the pilot fuel is generally very small in comparison to the torque produced by the main fuel. Combustion of the pilot fuel raises the pressure and temperature within the combustion chamber to an ignition threshold of the main fuel. Once the ignition threshold is reached, the main fuel begins to combust. The amount and the timing at which the pilot fuel is introduced into the combustion chamber are precisely metered to achieve the ignition threshold at a specified time in relation to the combustion cycle. The timing of the main fuel is not as closely controlled. In an engine that uses a gas mixer in the intake to meter the main fuel, transport delays between a fueling change at the gas mixer and the fueling change being realized as a change in engine torque result in slow engine response to changes that affect engine fueling requirements, such as changes in speed or engine loading.

Therefore, there is a need in pilot ignited engines to improve responsiveness to changes that affect engine fueling requirements.

SUMMARY

The present disclosure is directed to a system and method of controlling a pilot ignited engine to improve responsiveness to changes that affect the engine fueling requirements.

One implementation encompasses an engine system including an internal combustion engine, a first fuel regulator adapted to control an amount of a first fuel supplied to the engine, and a second fuel regulator adapted to control an amount of a second fuel supplied to the engine concurrently with the first fuel being supplied to the engine. The engine system also includes a controller coupled to the second fuel regulator and adapted to signal the second fuel regulator during steady state engine operation to adjust the amount of the second fuel supplied to the engine in a relationship to the amount of the first fuel supplied to the engine to operate in igniting the first fuel at a specified time. The controller is also adapted to signal the second fuel regulator during transient engine operation to adjust the amount of the second fuel supplied to the engine in a manner different from the relationship at steady state engine operation.

Another implementation encompasses an engine controller comprising a processor. The processor is configured to perform operations including determining an amount of a first fuel for supplying to an engine, determining an amount of a second fuel for supplying to the engine concurrently with the first fuel in a steady state engine operating condition in relation to the amount of the first fuel supplied to the engine to ignite the first fuel at a specified time, determining an amount of the second fuel for supplying to the engine concurrently with the first fuel in a transient engine operating condition in a manner different from the relationship at steady state engine operation.

Yet another implementation encompasses a method of supplying fuel to an engine. In the method an amount of a first fuel to supply to the engine is determined. An amount of a second fuel to supply to the engine concurrently with the first fuel in steady state engine operation is determined in relation to the first fuel to ignite the first fuel at a specified timing. The amount of the second fuel to supply to the engine concurrently with the first fuel in transient engine operation is determined in a manner different from the relationship at steady state engine operation.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
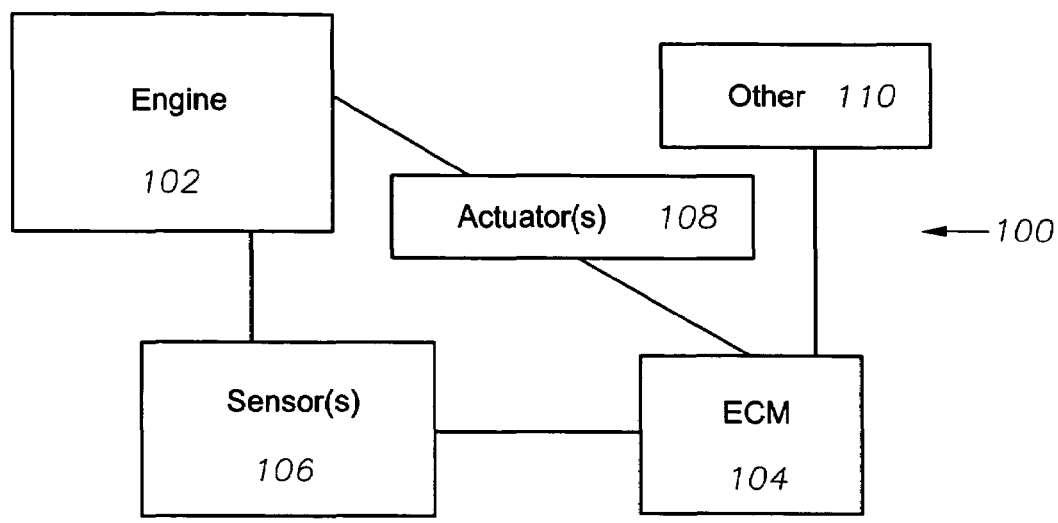
FIG. 1 is a schematic of an engine system constructed in accordance with the invention.

Referring first to FIG. 1, an illustrative engine system 100 constructed in accordance with the invention is depicted schematically. The engine control system 100 includes an engine control module (ECM) 104 operably coupled to communicate with one or more engine sensors 106 and one or more actuators 108. The engine sensors 106 may be coupled to an internal combustion engine 102, and sense one or more operating characteristics of the engine 102 and/or engine system 100 and output a signal representative of the operating characteristic. Some examples of typical engine operating characteristics include engine speed, a torque indicating characteristic such as manifold absolute pressure (MAP) or intake manifold density (IMD), power output of the engine, a characteristic indicative of the engine's air to fuel ratio such as exhaust oxygen content, ambient and/or engine temperature, ambient pressure, and others. The actuators 108 are adapted to control various engine system components (not specifically shown) used in controlling the engine and other engine system components. Some examples of typical engine components include a throttle, a turbocharger bypass or wastegate, an ignition system, air/fuel regulating device such as an adjustable fuel mixer, a fuel pressure regulator, fuel injectors and others. The ECM 104 may also be coupled to communicate with other components 110. Some examples of other components 110 can include a user interface that allows a user to query the ECM 104 or input data or instructions to the ECM 104, one or more external sensors that sense information other than the operating characteristics of the engine or engine system, monitoring or diagnostic equipment to which the ECM 104 can communicate characteristics of the system, and others.

Figure 2:
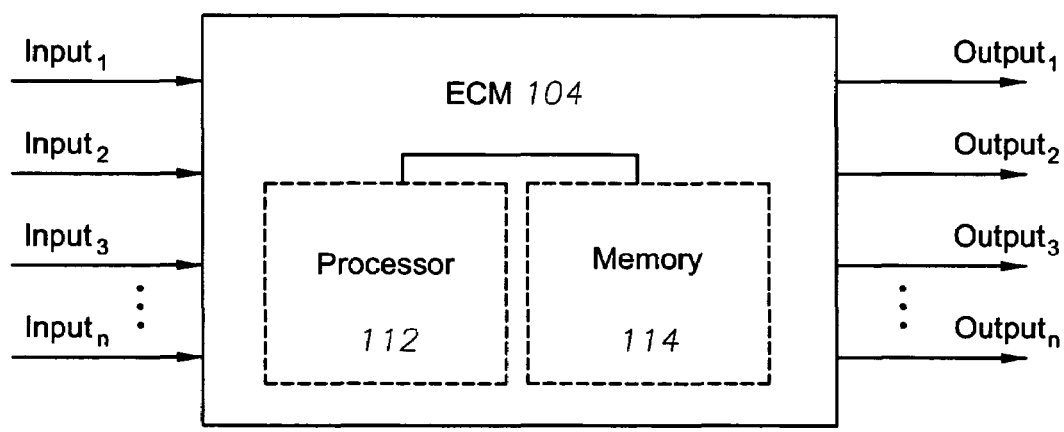
FIG. 2 is a schematic of an engine control module for use in an engine system constructed in accordance with the invention.

Referring to FIG. 2, the ECM 104 includes a processor 112 operably coupled to a computer readable medium or memory 114. The computer readable medium 114 may be wholly or partially removable from the ECM 104. The computer readable medium 114 contains instructions used by the processor 112 to perform one or more of the methods described herein. The ECM 104 can receive one or more input signals ($input_1 \ldots input_n$), such as from the sensors 106, actuators 108, and other components 110 and can output one or more output signals ($output_1 \ldots output_n$), such as to the sensors 106, actuators 108 and other components 110.

The ECM 104 operates to accelerate or decelerate the engine 102 (FIG. 1) to a specified operating state, for example a specified speed, torque output, or other specified operating state, and maintain the engine in steady state operation. To this end, the ECM 104 receives input from the sensors 106, including engine state parameters, and determines and outputs one or more actuator control signals adapted to control the actuators 108 to operate the engine 102.

Figure 3:
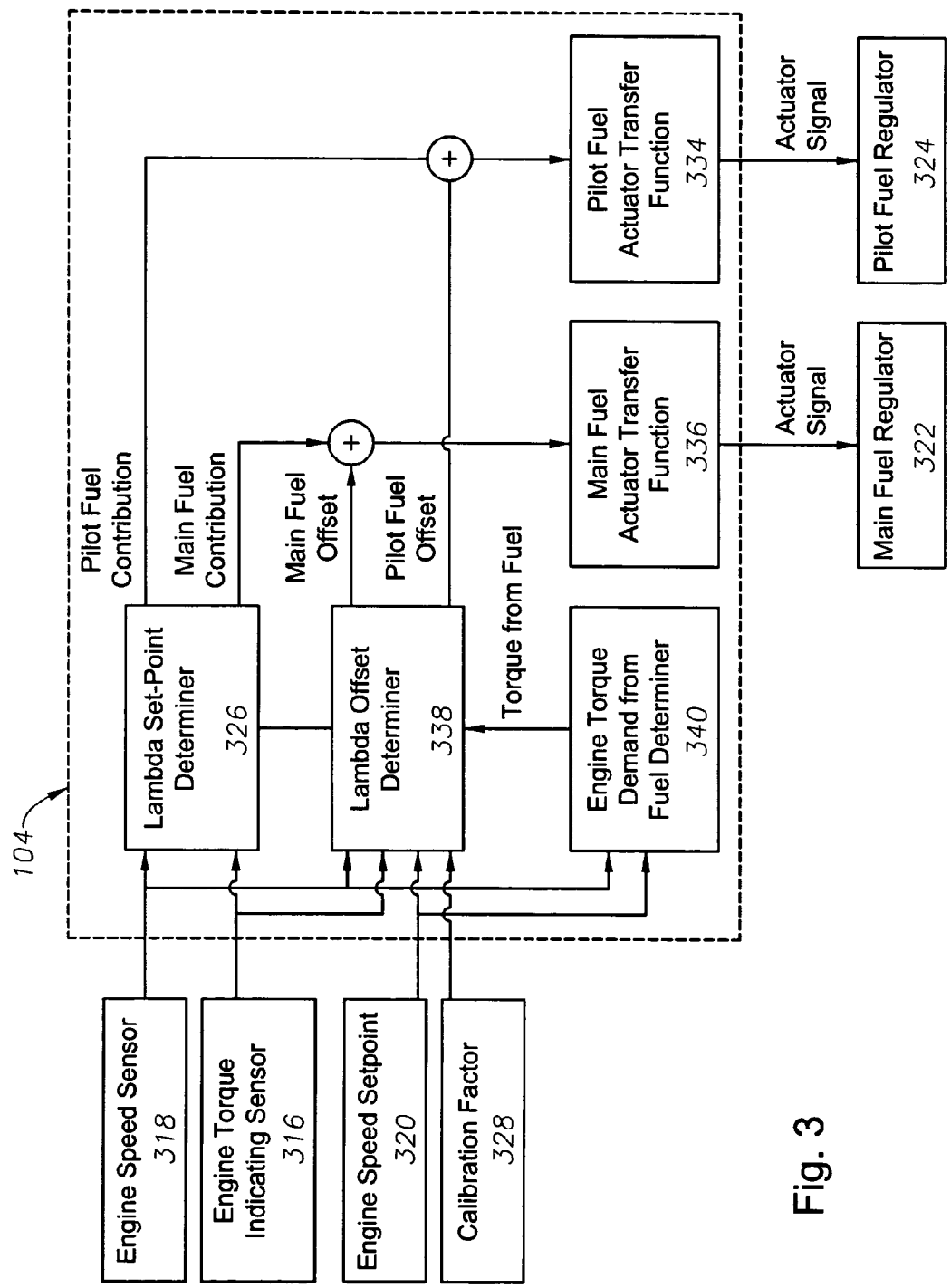
FIG. 3 is a schematic of the functional operation of an engine system constructed in accordance with the invention.

FIG. 3 depicts an illustrative ECM 104 for use in controlling the air and fuel mixture supplied to an engine. The illustrative ECM 104 of FIG. 3 receives an input of engine state parameters from the sensors 106, in this instance a torque indicating characteristic sensor 316, such as a MAP or IMD sensor, and an engine speed sensor 318, and outputs a signal to the actuators 108. The actuators 108 include at least a main fuel control regulator 322 and a pilot fuel control regulator 324 operable to control a ratio of air and fuel supplied to the engine. The main fuel control regulator 322 controls the main fuel, and the pilot fuel control regulator 324 controls the pilot fuel. Examples of fuel control regulators 322 and 324 include a fuel pressure regulator or air bypass in an engine system using a fixed air/fuel mixer, an adjustable air/fuel mixer, one or more fuel injectors injecting directly into the combustion chamber or remote from the combustion chamber, or other air/fuel regulator. Use of fuel injectors as the pilot fuel control regulator 324 enables precise timing and metering of pilot fuel in relation to the main fuel. Therefore, in one illustrative engine system, the fuel control regulator 322 is either an adjustable air/fuel mixer or a fuel pressure regulator or air bypass that is used to control a ratio of air and main fuel supplied by a fixed air/fuel mixer. The pilot fuel regulator 322 is one or more fuel injectors positioned to directly inject the pilot fuel into the combustion chamber. The ECM 104 receives an input from the torque indicating characteristic sensor 316 and the engine speed sensor 318, and determines and outputs an actuator control signal to control the operation of the air/fuel control regulators 322 and 324 as is discussed below.

The ECM 104 includes a lambda set-point determiner 326 that receives one or more engine state parameters and determines and outputs a main fuel contribution and a pilot fuel contribution selected to maintain a desired lambda set-point. The lambda set-point is selected to maintain engine operation substantially in steady state. As is discussed in more detail below, the main and pilot fuel contributions are used in determining actuator control signals operable to control the fuel control regulators 322 and 324. In determining the main and pilot fuel contributions, the illustrative ECM 104 uses engine speed from the engine speed sensor 318, a torque indicating characteristic (e.g. MAP or IMD) from the torque indicating characteristic sensor 316 and optionally other parameters, for example, ambient and/or intake temperature. It is also anticipated that the ECM 104 may use other sensors alternatively or in combination with those discussed above, such as a mass-air sensor or combustion mixture flow volume sensor.

As a pilot fueling configuration, combustion of the pilot fuel operates in igniting the main fuel by raising the pressure and temperature within the combustion chamber to a main fuel ignition threshold. Once the main fuel ignition threshold has been reached, the main fuel begins to combust (in addition to the remaining pilot fuel). The amount of the pilot fuel contribution is selected by the lambda set-point determiner 326 in relation to the amount of the main fuel contribution such that the ignition threshold of the main fuel is achieved at a specified time in a combustion cycle of the engine (a cycle being from intake to exhaust of a combustion chamber). The specified time is selected in a balance between achieving substantially complete combustion of air and main and pilot fuels in the combustion chamber and synchronizing the occurrence of peak pressure from combustion with the position of the piston in the combustion chamber to efficiently convert the energy of combustion into torque output from the engine.

The lambda set-point determiner 326 can determine the main and pilot fuel contributions using a look-up table including at least values indicative of engine speed and torque indicating characteristics correlated to main and pilot fuel contributions determined to maintain steady state engine operation. Alternately or in combination with a look-up table, the lambda set-point determiner 324 can determine the lambda set-point using a formulaic calculation as a function of inputs from one or more of the sensors 106, for example, engine speed and torque indicating characteristic. In either instance, the main fuel contribution and pilot fuel contribution are selected in relation to the respective engine speed and torque indicating characteristic values to provide a specified combustion mixture to the engine to maintain steady state operation. Therefore, different lambda set-points may effectuate different engine operating states. Furthermore, in either instance, the pilot fuel contribution is selected as a function of the main fuel contribution to achieve the main fuel ignition threshold at the specified time.

The ECM 104 includes a lambda offset determiner 338 that receives an input from a torque demand from fuel determiner 340 and determines an amount to increase or decrease the main fuel contribution and pilot fuel contribution in response to transient engine operating conditions. The output of the lambda offset determiner 338 is a main fuel offset (a positive or negative value) that modifies the main fuel contribution prior to the main fuel actuator transfer function 336 and a pilot fuel offset (a positive or negative value) that modifies the pilot fuel contribution prior to the pilot fuel actuator transfer function 334. In the illustrative ECM 104, the main fuel offset and the pilot fuel offset are added to the main fuel contribution and pilot fuel contribution respectively; however, it is anticipated that the main and pilot fuel offsets could be applied as multipliers or in a formulaic calculation, or could be applied differently (e.g. the main fuel offset applied as an adder and the pilot fuel offset applied as a multiplier).

In transient conditions, when the engine is accelerated or decelerated in either torque, speed or both, the air/fuel requirements of the engine tend to increase during acceleration and decrease during deceleration. To compensate during acceleration, the lambda offset determiner 338 momentarily increases the amount of fuel supplied to the engine when running lean or near stoichiometric (i.e. richens the air/fuel ratio) beyond what is required to operate the engine at the new steady state operating condition. Increasing the amount of fuel supplied during acceleration increases the engine's torque output and produces a more responsive performance and quicker acceptance of an increased torque loading. During deceleration, the lambda offset determiner 338 decreases the amount of fuel supplied (i.e. leans the air/fuel ratio) below that required by the engine at the new steady state operating condition helping the engine shed unwanted torque output and prevent over speeding. The amount of the increase or decrease in the amount of fuel supplied to the engine can be related to the degree of transience of the engine. For example, the more the engine deviates from the steady state operation and the rate at which the deviation from steady state operation develops are indicative of the degree of transience.

In a configuration where the main fuel offset and pilot fuel offset are combined with the main fuel contribution and the pilot fuel contribution as an adder, the lambda offset determiner 338 increases the amount of fuel supplied during acceleration by outputting positive main and pilot fuel offsets, and decreases the amount of fuel supplied during deceleration by outputting a negative offset that subtracts from the main fuel and pilot fuel contributions.

The amount by which the lambda offset determiner 338 affects the pilot fuel contribution need not be determined in the same relationship to the main fuel as it is determined under steady state operation. For example, the offset determiner 338 may determine the pilot fuel offset during acceleration so that more pilot fuel is provided to the engine than is necessary to ignite the main fuel at the specified time in the combustion cycle. In some instances, the pilot fuel offset may be determined to be greater than the main fuel offset or so that the engine is provided with more pilot fuel than main fuel. One manner of determining the pilot fuel offset can involve selecting the pilot fuel offset so that the engine is accelerated, during at least part of an acceleration in speed or torque, primarily on the pilot fuel. In other words, for at least part of an acceleration in speed or torque, a majority of the torque produced by the engine is produced from combusting the pilot fuel. To this end, the main and pilot fuels can be allocated a relative torque contribution indicative of the amount of torque each produces in a given combustion cycle. As mentioned above, in steady state operation, any torque contribution attributable to combustion of the pilot fuel is secondary, and because only a small amount of pilot fuel is needed to ignite the main fuel, the pilot fuel torque contribution is small. However, in acceleration, the pilot fuel offset determined by the lambda offset determiner 338 can be selected to increase the relative torque contribution from the pilot fuel over the torque contribution of the main fuel. In most instances this will provide more pilot fuel than is needed to ignite the main fuel at the specified time, as well as, likely more pilot fuel than main fuel. The increased pilot fuel torque contribution can be selected as a function of, and some instances in proportion to, the amount the engine's operation deviates from the steady state condition during the transient condition. Such deviation can be derived from the torque demand from fuel determiner 340, discussed in more detail below.

In deceleration, the lambda offset determiner 338 may be configured to select a main fuel offset and pilot fuel offset in a relationship similar to the relationship at steady state. In other words, the pilot fuel offset can be selected in relation to the main fuel offset to ignite the main fuel at a specified time in the combustion cycle. The increase or decrease in main and pilot fuels can be selected as a function of, and some instances in proportion to, the amount the engine's operation deviates from the steady state condition during the transient condition. Such deviation can be derived from the torque demand from fuel determiner 340, discussed in more detail below.

The lambda offset determiner 338 can determine the pilot fuel offset using a lookup table correlating torque from fuel (from the torque demand from fuel determiner 340) and one or more engine state parameters, such as MAP or IMD from the torque indicating characteristic sensor 316 and engine speed from the engine speed sensor 318 and the engine speed set-point 320, to main fuel offset values. Alternately, or in combination with a lookup table, the lambda offset determiner 338 can use a formulaic calculation to determine the pilot fuel offset. Likewise, the main fuel offset can be determined using a lookup table correlating one or more engine state parameters to main fuel offset values and/or a formulaic calculation. The lookup table or formulaic calculation for the main fuel offset may account for the torque from fuel from the torque demand from fuel determiner 340, or may omit the torque from fuel. In an instance where the lookup table or formulaic calculation for the main fuel offset accounts for torque from fuel from the torque demand from fuel determiner 340, the lambda offset determiner 338 can apply a calibration factor (received as input 328) that adjusts the amount, for example by reducing the amount, of the torque from fuel that is used in determining the main fuel offset. The remainder of the torque from fuel is used in determining the pilot fuel offset. The calibration factor can be selected so that a majority of the torque from fuel is used in determining the pilot fuel offset during acceleration. In an instance where the lookup table or formulaic calculation for the main fuel offset does not account for the torque from fuel, the entire torque from fuel value is used in determining the pilot fuel offset. Alternately, or in combination with a calibration factor, the lookup table or formulaic calculation can account for a desire to have increased input from the pilot fuel offset in meeting the torque from fuel demand in acceleration.

The determination of the pilot fuel offset by a lambda offset determiner that does not account for a deliberately increased torque contribution of the pilot fuel during acceleration differs from the determination of the pilot fuel offset in the lambda offset determiner 338 in that it determines the pilot fuel offset on the main fuel offset alone. In other words, the pilot fuel offset is determined as a function of the additional amount of pilot fuel needed to ignite the additional main fuel added by the main fuel offset. Selecting the pilot fuel offset during acceleration to provide an increased torque contribution can provide faster transient response (i.e. acceleration and load acceptance). For example, as is often the case with gaseous natural gas main fueled and diesel pilot fueled engines, the main fuel may be introduced using a gas mixer in the intake of the engine and the pilot fuel directly injected into the combustion chamber. Because the gas mixer is substantially displaced from the combustion chamber, transport delays between effecting a fueling change of the main fuel at the gas mixer and the fueling change being realized as a change in torque output of the engine result in slow transient response (i.e. slow response to changes in loading or slow to begin changes in speed). Effecting a fueling change of the pilot fuel that is directly injected into the combustion chamber and it being realized as a change in torque output of the engine is much faster, because the fuel is directly injected into the combustion chamber.

The lambda offset determiner 338 can also function to adjust the pilot fuel offset on a cylinder by cylinder basis, for example, to balance the torque produced by different cylinders of a multi-cylinder engine. The adjustment may be static, for example, predetermined such as by periodic testing of the engine and applied the same in each combustion cycle of the engine. Alternately, the adjustment may be dynamically determined, derived continually such as from a torque sensor coupled to the engine, and different amounts of adjustment applied to the pilot fuel offset as the torque produced by different cylinders changes. The adjustment need not be determined directly from the torque output of given cylinders, but can be based on other parameters related to torque, such as peak cylinder pressure, indicated mean effective pressure, total heat release, and instantaneous crankshaft angular velocity. Furthermore, the lambda offset determiner 338 need not operate in balancing the torque produced by different cylinders only during transient engine operating conditions, but can operate also during steady state conditions. Adjustment on a cylinder by cylinder basis using the pilot fuel offset allows the ECM 104 to compensate for variations between cylinders, and can allow cylinder by cylinder compensation in an instance where the main fuel is metered with a gas mixer and the pilot fuel directly injected into the combustion chamber.

The main fuel actuator transfer function 336 receives at least the main fuel contribution signal (incorporating the main fuel offset signal), and determines an actuator control signal adapted to operate the main fuel regulator 322. The pilot fuel actuator transfer function 334 receives at least the pilot fuel contribution signal (incorporating the pilot fuel offset signal), and determines an actuator control signal adapted to operate the pilot fuel regulator 324. The actuator transfer functions 336 and 334 can receive and account for other inputs in determining their respective actuator control signals, such as, the engine state parameters discussed above, fuel pressure, ambient pressure, engine temperature, ambient temperature, and others. The actuator transfer functions 334 and 336 determine their respective actuator control signals using a look-up table correlating main/pilot contribution signals and any other inputs to actuator control signals, by calculation as a function of the main/pilot contribution signals and any other inputs, by a combination of a look-up table and a calculation, or by other method.

Figure 4:
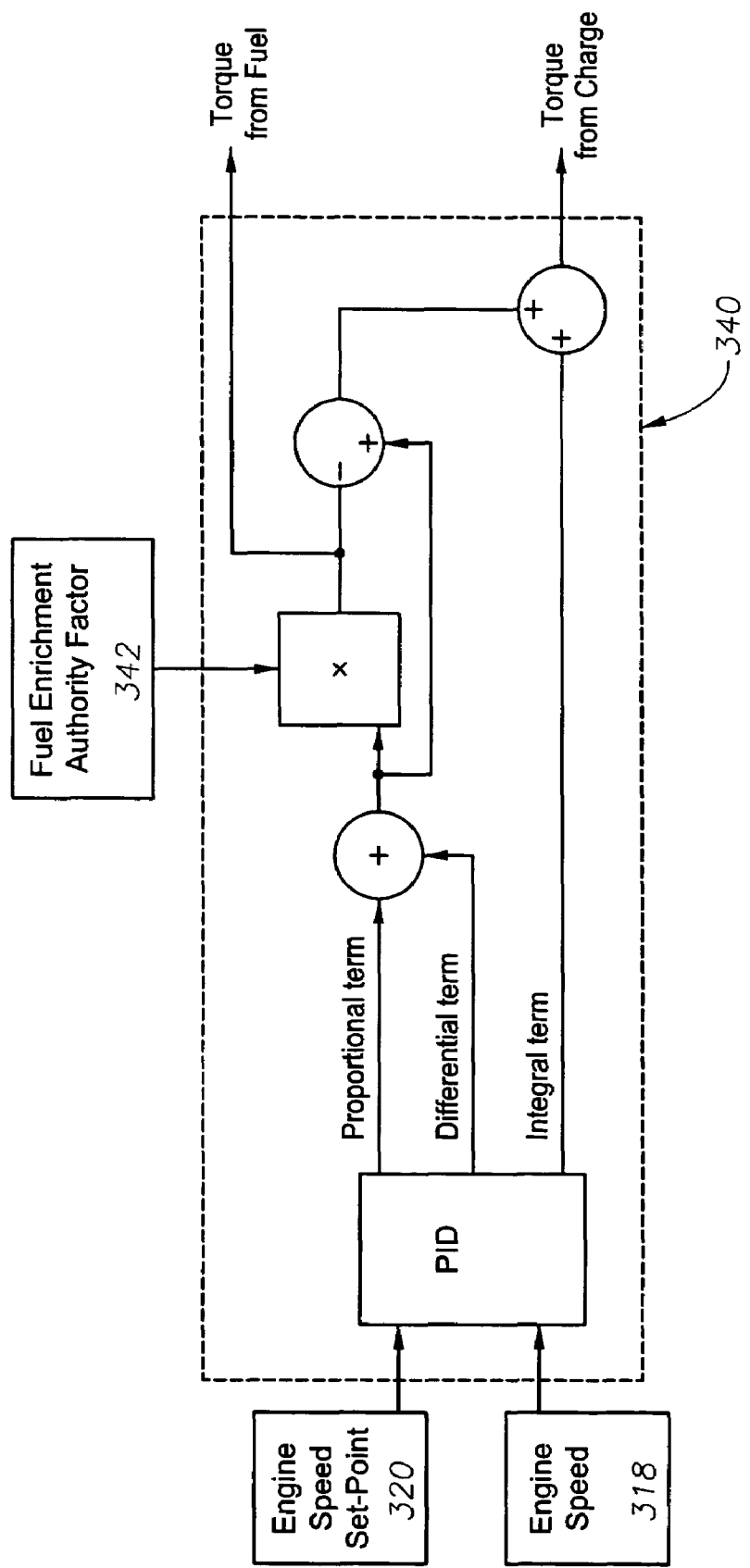
FIG. 4 is a schematic of the functional operation of an engine torque demand determiner for use in an engine system constructed in accordance with the invention.

FIG. 4 depicts the functional operation of an illustrative torque demand from fuel determiner suitable for determiner 340. The illustrative determiner 340 includes a PID controller 410, such as a PID controller that is used in the engine's governor. The PID controller 410, if configured to maintain steady state engine speed, receives a user-defined engine speed set-point 320 and measured engine speed from the engine speed sensor 318. The PID controller 410 determines a proportional term indicative of the difference between the engine speed set-point 320 and the measured engine speed (i.e. error), an integral term indicative of the integral of the error with time, and a differential term indicative of the rate of change of error with time. The proportional term and the differential terms, taken individually or together, are indicative of the degree of transience of the engine. Therefore, the proportional term can be factored by a fuel enrichment authority factor 342 and output as the torque from fuel. The remainder of the proportional term, i.e. the difference between the proportional term and the proportional term factored by the authority factor 342, is summed with the integral term and differential term and output as the torque from charge control. Alternately, the determiner 340 can use the proportional and differential terms factored by the fuel enrichment authority factor 342 in determining the torque from fuel and use the remainder of the proportional and differential terms with the integral term to determine the torque from charge control. The torque from charge control can be used in operating a throttle valve in the intake of the engine to control the amount of combustion mixture (charge) supplied to the engine. In either instance, at steady state operation the proportional and differential terms will be equal to zero. Thus, the torque from fuel also be zero, and not modify the main fuel contribution or pilot fuel contribution. However, in acceleration or deceleration (transient operating conditions), non-zero values of the proportional and differential terms result in a non-zero torque from fuel. The non-zero torque from fuel can then modify the main fuel contribution and the pilot fuel contribution. The transient fuel adjustment can be disabled by setting the fuel enrichment authority factor 342 to zero.

The lambda set-point determiner 326 may optionally include feed forward compensation by communicating with a load or a controller for a load (not specifically shown) applied to the engine to derive a load coming signal. In this instance, the lambda set-point determiner 324 will receive a load coming signal indicating changes in loading, and optionally the magnitude of the load coming, as an optional input 314. Using the load coming signal, the lambda set-point determiner 326 can anticipate engine output requirements based on upcoming changes in load communicated by the load coming signal and adjust the determined main fuel contribution and pilot fuel contribution in anticipation of the upcoming changes in load. An example of a feed forward compensation that can be used in the engine system 100 is disclosed in U.S. Pat. No. 6,564,477, entitled Feedforward Engine Control Governing System, the disclosure of which is incorporated herein in its entirety.

Figure 5:
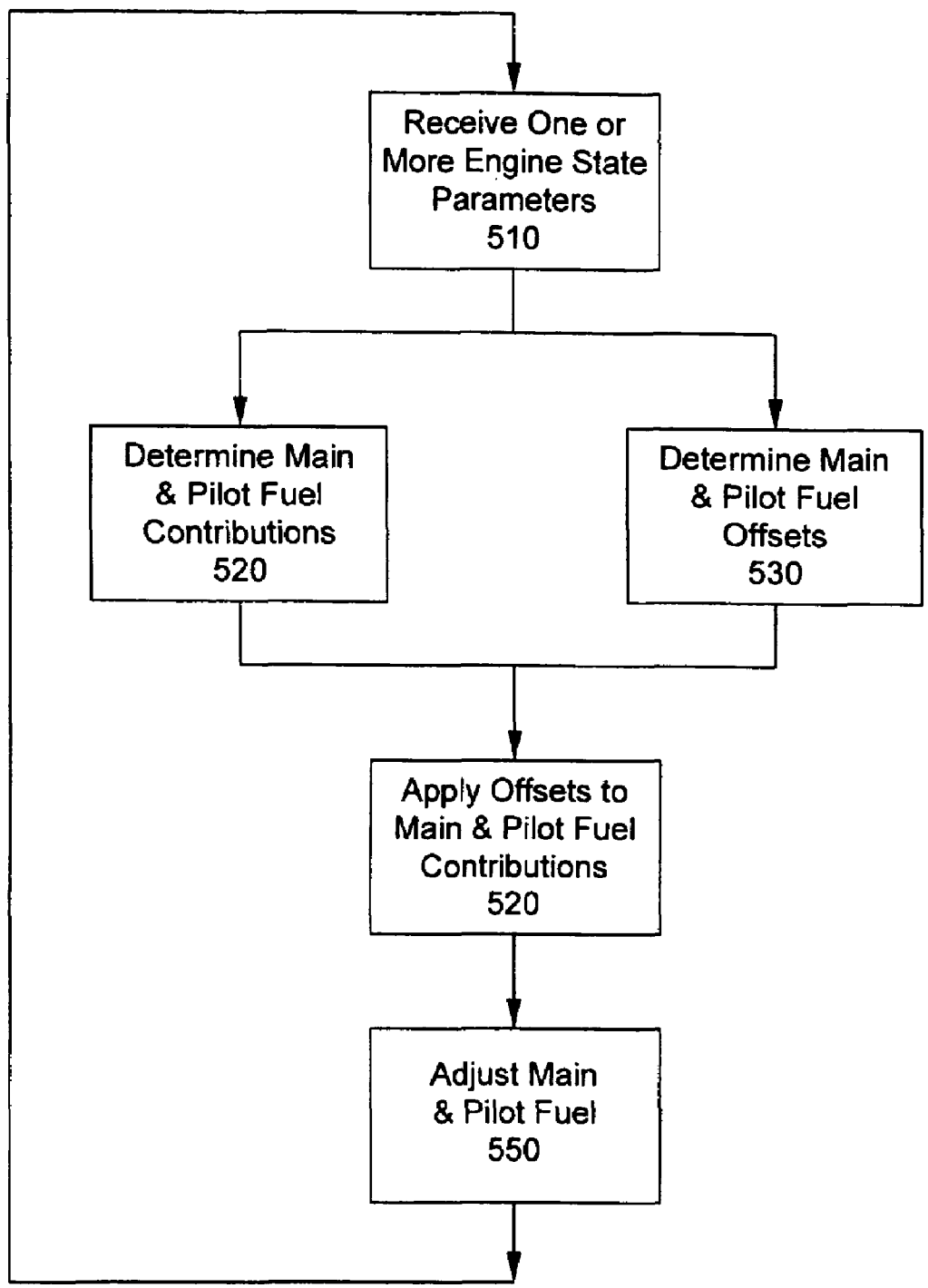
FIG. 5 is a flow diagram of the operation of an engine control module constructed in accordance with the invention.

Referring to FIG. 5, the operation of the ECM is depicted schematically. At block 510, the ECM receives signals indicative of one or more engine state parameters. As noted above, the engine state parameters may in one instance include engine speed and an engine torque indicating parameter, such as MAP or intake manifold density IMD, power output of the engine, a characteristic indicative of the engine's air to fuel ratio such as exhaust oxygen content, ambient and/or engine temperature, ambient pressure, and others.

At block 520, the ECM determines, from the received engine state parameters, main and pilot fuel contributions for operation of the engine at steady state. At steady state operation, the pilot fuel contribution is determined at least in part in relation to the main fuel contribution to operate in igniting the main fuel contribution at the predetermined time in the combustion cycle. At block 530, the ECM determines, from the received engine state parameters, main and pilot fuel offsets to apply to the main and pilot fuel contributions for operation of the engine in transient conditions. The offsets may increase or decrease the amount of main and pilot fuels supplied to the engine depending on whether the transient condition is acceleration or deceleration in speed or torque. At steady state operation, the offsets will not affect the amount of main and pilot fuel supplied to the engine. At block 530, the ECM determines the pilot fuel offset in a manner different from the relationship to the first fuel by which the pilot fuel contribution is determined in block 520. For example, in steady state operation, the amount of pilot fuel supplied to the engine according to the pilot fuel contribution is much less than the main fuel supplied to the engine. As discussed above, in acceleration, the pilot fuel offset can be determined to affect the amount of pilot fuel supplied to the engine so that the amount of pilot fuel is greater than is necessary to ignite the main fuel at the predetermined time in the combustion cycle, and in some instances, so that the amount of pilot fuel supplied to the engine is greater than the amount of main fuel supplied to the engine. The pilot fuel offset can be determined in acceleration so that the torque contributed to a combustion cycle of the engine by the pilot fuel is greater than the torque contributed to a combustion cycle by the main fuel. In deceleration, the pilot fuel offset may be determined to maintain the same relationship of pilot fuel to main fuel as is in steady state operation, or may be determined otherwise.

At block 540, the main and pilot fuel offsets are combined with the main and fuel contributions. At block 550, the amount of main and pilot fuels supplied to the engine are adjusted according to output of block 540. The series of blocks 510–550 may then be repeated continually as needed to operate the engine.

A number of embodiments of the invention have been described. Nevertheless, it will be understood that various modifications may be made without departing from the spirit and scope of the invention. Accordingly, other embodiments are within the scope of the following claims.

What is claimed is:

1. An engine system comprising:
   an internal combustion engine;
   a first fuel regulator adapted to control an amount of a first fuel supplied to the engine;
   a second fuel regulator adapted to control an amount of a second fuel supplied to the engine concurrently with the first fuel being supplied to the engine; and
   a controller coupled to the second fuel regulator and adapted to signal the second fuel regulator during steady state engine operation to adjust the amount of the second fuel supplied to the engine in a relationship to the amount of the first fuel supplied to the engine to operate in igniting the first fuel at a specified time and adapted to signal the second fuel regulator during transient engine operation to adjust the amount of the second fuel supplied to the engine in manner different from the relationship at steady state engine operation.

2. The engine system of claim 1 wherein the transient engine operation is acceleration and the controller is adapted to signal the second fuel regulator to adjust the amount of the second fuel supplied to the engine in an amount that is greater than an amount determined according to the relationship at steady state engine operation.

3. The engine system of claim 1 wherein the controller is adapted to signal the first fuel regulator to adjust the amount of the first fuel supplied to the engine.

4. The engine system of claim 1 wherein the controller is adapted to adjust the amount of the second fuel supplied to the engine in the transient engine operating condition to an amount that is greater than necessary to ignite the first fuel.

5. The engine system of claim 1 wherein the controller is adapted to adjust the amount of the second fuel supplied to the engine in the transient engine operating condition in an amount that is greater than necessary to ignite the first fuel at the specified time.

6. The engine system of claim 1 wherein the controller is adapted to signal the second fuel regulator during transient engine operation to adjust the amount of the second fuel supplied to the engine in relation to a reduced portion of a difference between a specified engine operating state and a measured engine operating state and wherein a remaining portion of the difference between the specified engine operating state and the measured engine operating state is used in operating a throttle in an intake of the engine system.

7. The engine system of claim 1 wherein the transient engine operating condition comprises at least one of a changing engine speed, a changing engine loading, an anticipated change in the engine speed, or an anticipated change in engine loading.

8. The engine system of claim 1 wherein the first fuel regulator comprises a gas mixer and the second fuel regulator comprises an injector.

9. The engine system of claim 1 wherein the first fuel is natural gas and the second fuel is diesel.

10. The engine system of claim 1 wherein the controller is adapted to signal the second fuel regulator during transient engine operation to adjust the amount of the second fuel supplied to the engine to adjust a torque contribution of the second fuel in relation to a torque contribution of the first fuel.

11. The engine system of claim 10 wherein the controller is adapted to signal the second fuel regulator during transient engine operation to adjust the amount of the second fuel supplied to the engine to produce a ratio of the torque contribution of the second fuel to the torque contribution of the first fuel that is greater in response to the transient engine operating condition than in substantially steady state engine operation.

12. The engine system of claim 1 wherein the controller is adapted to signal the second fuel regulator during transient engine operation to adjust the amount of the second fuel supplied to the engine in relation to a difference between a specified engine operating state and a measured engine operating state.

13. The engine system of claim 12 wherein the controller is adapted to signal the second fuel regulator during transient engine operation to adjust the amount of the second fuel supplied to the engine further in relation to a rate of change of the difference between the specified engine operating state and the measured engine operating state.

14. The engine system of claim 1 wherein the controller is coupled to a load on the engine to receive a load coming signal, and adapted to signal the second fuel regulator to adjust the amount of the second fuel supplied to the engine in relation to the load coming signal.

15. The engine system of claim 14 wherein the controller is coupled to the first fuel regulator to adjust the amount of the first fuel supplied to the engine and adapted to signal the first fuel regulator to adjust the amount of the first fuel supplied to the engine in relation to the load coming signal.

16. The engine system of claim 1 wherein internal combustion engine comprises a plurality of combustion chambers;
   wherein the second fuel regulator comprises a plurality of second fuel regulators adapted to individually control an amount of the second fuel supplied to the plurality of combustion chambers concurrently with the first fuel being supplied to the combustion chambers; and
   wherein the controller is adapted to signal the plurality of second fuel regulators to individually adjust the amount of the second fuel supplied in different amounts for different combustion chambers.

17. The engine system of claim 16 wherein the controller is adapted to signal the plurality of second fuel regulators to individually adjust the amount of the second fuel supplied to compensate for differences in torque produced at each of the plurality of combustion chambers.

18. The engine system of claim 17 wherein the controller is adapted to receive a signal indicative of the torque produced at each of the plurality of combustion chambers and determine the compensation in relation to the signal.

19. An engine controller comprising a processor configured to perform operations comprising:
determine an amount of a second fuel for supplying to the engine concurrently with a first fuel that is being supplied to the engine in a steady state engine operating condition in relation to the amount of the first fuel supplied to the engine to ignite the first fuel at a specified time; and
determine an amount of the second fuel for supplying to the engine concurrently with the first fuel in a transient engine operating condition in a manner different from the relationship at steady state engine operation.

20. The engine controller of claim 19 wherein the transient engine operation is acceleration and the processor is configured to perform operations comprising:
determine the amount of the second fuel in the transient engine operating condition to be greater than the amount determined according to the relationship at steady state engine operation.

21. The engine controller of claim 19 wherein the processor is configured to determine the amount of the second fuel in the transient engine operating condition to be an amount that is greater than necessary to ignite the first fuel.

22. The engine controller of claim 19 wherein the processor is configured to determine the amount of the second fuel in the transient engine operating condition to be an amount that is greater than necessary to ignite the first fuel at the specified time.

23. The engine controller of claim 19 wherein the processor is configured to determine the amount of the second fuel in the transient engine operating condition in relation to a reduced portion of a difference between a specified engine operating state and a measured engine operating state and wherein a remaining portion of the difference between the specified engine operating state and the measured engine operating state is used in operating a throttle in an intake of the engine system.

24. The engine controller of claim 19 wherein the processor is configured to receive a load coming signal from a load coupled to the engine, and wherein the processor is operable to determine the amount of the second fuel supplied to the engine in relation to the load coming signal.

25. The engine controller of claim 19 wherein the processor is configured to determine the amount of the second fuel in the transient engine operating condition to adjust a torque contribution of the second fuel in relation to a torque contribution of the first fuel.

26. The engine controller of claim 25 wherein the processor is configured to determine the amount of the second fuel to provide a ratio of the torque contribution of the second fuel to the torque contribution of the first fuel to be greater in response to the transient engine operating condition than in substantially steady state engine operation.

27. The engine controller of claim 19 wherein the processor is configured to determine the amount of the second fuel in the transient engine operating condition in relation to a difference between a specified engine operating state and a measured engine operating state.

28. The engine controller of claim 27 wherein the processor is configured to determine the amount of the second fuel in the transient engine operating condition further in relation to a rate of change of the difference between the specified engine operating state and the measured engine operating state.

29. The engine controller of claim 19 wherein the processor is further configured to determine an amount of the second fuel individually for a plurality of combustion chambers of an engine.

30. The engine controller of claim 29 wherein the processor is further configured to determine an amount of the second fuel individually for a plurality of combustion chambers of an engine to compensate for differences in torque produced at each of the plurality of combustion chambers.

31. The engine controller of claim 30 wherein the processor is further configured to receive a signal indicative of the torque produced at each of the plurality of combustion chambers and determine the compensation in relation to the signal.

32. A method of supplying fuel to an engine comprising:
determining an amount of a second fuel to supply to the engine concurrently with a first fuel that is being supplied to the engine in steady state engine operation in relation to the first fuel to ignite the first fuel at a specified timing; and
determining the amount of the second fuel to supply to the engine concurrently with the first fuel in transient engine operation in a manner different from the relationship at steady state engine operation.

33. The method of claim 32 wherein determining the amount of the second fuel in transient engine operation comprises determining the amount of the second fuel in acceleration to be greater than an amount determined according to the relationship at steady state engine operation.

34. The method of claim 32 wherein determining the amount of the second fuel in transient engine operation comprises determining the amount of the second fuel to be greater than necessary to ignite the first fuel.

35. The method of claim 32 wherein determining the amount of the second fuel in transient engine operation comprises determining the amount of the second fuel to be greater than necessary to ignite the first fuel at the specified timing.

36. The method of claim 32 determining the amount of the second fuel in transient engine operation comprises determining the amount of the second fuel in relation to a portion of the difference between a specified engine operating state and a measured engine operating state and using a remainder of the difference between the specified engine operating state and the measured engine operating state in operating a throttle in an intake of the engine.

37. The method of claim 32 further comprising receiving a signal indicative of an upcoming load change on the engine and determining the amount of the second fuel in anticipation of the upcoming load change.

38. The method of claim 32 wherein determining the amount of the second fuel in transient engine operation comprises determining the amount of the second fuel to adjust a torque contribution of the second fuel in relation to a torque contribution of the first fuel.

39. The method of claim 38 wherein determining the amount of the second fuel to adjust a torque contribution of the second fuel comprises adjust the amount of the second fuel to produce a ratio of the torque contribution of the second fuel to the torque contribution of the first fuel that is greater in transient engine operation than in substantially steady state engine operation.

40. The method of claim 32 wherein determining the amount of the second fuel in transient engine operation comprises determining the amount of the second fuel in relation to a difference between a specified engine operating state and a measured engine operating state.

41. The method of claim 40 wherein determining the amount of the second fuel comprises determining the amount of the second fuel further in relation to a rate of change of the difference between the specified engine operating state and the measured engine operating state.

42. The method of claim 32 wherein determining the amount of the second fuel comprises determining the amount of the second fuel individually for a plurality of combustion chambers of the engine.

43. The method of claim 42 wherein determining the amount of the second fuel comprises determining the amount to compensate for a difference in torque produced at each of the plurality of combustion chambers of the engine.

44. The method of claim 42 further comprising receiving a signal indicative of the torque produced at each of the plurality of combustion chambers; and wherein determining the amount of the second fuel to compensate for a difference in torque comprises determining the amount of the second fuel in relation to the signal.

* * * * *

UNITED STATES PATENT AND TRADEMARK OFFICE
CERTIFICATE OF CORRECTION

PATENT NO. : 7,044,103 B2  
APPLICATION NO. : 10/919419  
DATED : May 16, 2006  
INVENTOR(S) : Andrew May Page 1 of 1

It is certified that error appears in the above-identified patent and that said Letters Patent is hereby corrected as shown below:

Column 8, line 36–replace "6,564,477" with -- 6,564,774--

Signed and Sealed this

Eighth Day of August, 2006

JON W. DUDAS  
*Director of the United States Patent and Trademark Office*